United States Patent
Koo et al.

(10) Patent No.: US 8,538,482 B2
(45) Date of Patent: Sep. 17, 2013

(54) APPARATUS AND METHOD FOR TRANSMITTING COMP FEEDBACK INFORMATION

(75) Inventors: Ja Ho Koo, Gyeonggi-do (KR); Moon Il Lee, Gyeonggi-do (KR); Jian Xu, Gyeonggi-do (KR); Jae Hoon Chung, Gyeonggi-do (KR); Bin Chul Ihm, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 12/780,487

(22) Filed: May 14, 2010

(65) Prior Publication Data

US 2010/0291940 A1 Nov. 18, 2010

Related U.S. Application Data

(60) Provisional application No. 61/178,486, filed on May 14, 2009.

(30) Foreign Application Priority Data

Dec. 14, 2009 (KR) .................. 10-2009-0123844

(51) Int. Cl.
*H04M 1/00* (2006.01)
(52) U.S. Cl.
USPC ............ 455/562.1; 455/450; 455/452.2; 455/561

(58) Field of Classification Search
None
See application file for complete search history.

(56) References Cited

U.S. PATENT DOCUMENTS

| | | | |
|---|---|---|---|
| 2009/0034636 A1* | 2/2009 | Kotecha et al. | 375/260 |
| 2009/0130980 A1* | 5/2009 | Palanki et al. | 455/63.1 |
| 2009/0247084 A1* | 10/2009 | Palanki | 455/63.1 |
| 2010/0159972 A1* | 6/2010 | Cho et al. | 455/501 |
| 2010/0232336 A1* | 9/2010 | Choudhury et al. | 370/312 |
| 2010/0273492 A1* | 10/2010 | Liu et al. | 455/446 |

\* cited by examiner

*Primary Examiner* — Suhail Khan
(74) *Attorney, Agent, or Firm* — Morgan, Lewis & Bockius LLP

(57) ABSTRACT

A method of efficiently transmitting CoMP feedback information from an user equipment, which performs CoMP operation, in a wireless communication system to reduce inter-cell interference is disclosed. The user equipment requests a neighboring cell, which affects the user equipment through interference, to restrict use of a specific beam pattern group in a serving cell direction. In this case, whether the user equipment will request such restriction is determined based on a channel status value of the user equipment. If the user equipment determines to request such restriction, the user equipment transmits a request message to a serving base station, the request message requesting to restrict use of the specific beam pattern group. In this case, the user equipment performs scheduling and requests a specific neighboring cell to restrict use of the specific beam pattern group at a specific resource region.

5 Claims, 9 Drawing Sheets

APPARATUS AND METHOD FOR TRANSMITTING COMP FEEDBACK INFORMATION

Pursuant to 35 U.S.C. §119(e), this application claims the benefit of priority to Provisional Application No. 61/178,486, filed on May 14, 2009 and Korean application No. 2009-0123844, filed on Dec. 14, 2009, the contents of which are incorporated by reference herein in their entirety.

BACKGROUND OF THE INVENTION

1. Field of the Invention

The present invention relates to a wireless communication system, and more particularly, to a method of transmitting feedback information from an user equipment that performs CoMP operation.

2. Discussion of the Related Art

Recently, a multiple input multiple output (MIMO) system has received much attention as a broadband wireless communication technology. The MIMO system means a system that enhances communication efficiency of data by using a plurality of antennas. The MIMO system can be divided into a spatial multiplexing scheme and a spatial diversity scheme depending on transmission of same data.

The spatial multiplexing scheme means a scheme that can transmit data at high rate without even increasing a system bandwidth by simultaneously transmitting different data through a plurality of transmitting antennas. The spatial multiplexing scheme means a scheme that can obtain transmission diversity by transmitting same data from a plurality of transmitting antennas. An example of the spatial diversity scheme includes a space time channel coding scheme.

Also, the MIMO system can be divided into an open loop system and a closed loop system depending on feedback of channel information from a receiving side to a transmitting side. An example of the open loop system includes a space-time trellis code (STTC) system in which a transmitting side transmits information in parallel while a receiving side detects a signal by repeatedly using a zero forcing (ZF) scheme and a minimum mean square error (MMSE) scheme and obtains transmission diversity and encoding gain by using a blast and spatial area that can increase information as much as the number of transmitting antennas. An example of the closed loop system includes a transmit antenna array (TxAA) system.

A coordinated multi-point system (hereinafter, referred to as 'CoMP system') is the system for improving throughput of a user located at the cell edge by applying improved MIMO transmission under the multi-cell environment. If the CoMP system is applied, inter-cell interference can be reduced under the multi-cell environment. In case of the CoMP system, a user equipment can commonly be supported with data from multi-cell base stations.

Also, each base station can improve system throughput by supporting same radio frequency resource to one or more user equipments (UE1, UE2, ..., UEK) at the same time. Also, the base station can perform a space division multiple access (SDMA) method based on channel status information (CSI) between the base station and the user equipment.

The CoMP system can be divided into a coordinated MIMO (Co-MIMO) type joint processing (JP) scheme through data sharing and a coordinated scheduling scheme/beamforming (CS/CB) scheme.

FIG. 1 is a conceptional diagram illustrating a CoMP system of intra eNBs and an inter eNB according to the related art.

Referring to FIG. 1, intra base stations 110, 120 and inter base station 130 exist under a multi cell environment. According to a long term evolution (LTE), the intra base stations include several cells (or sectors). Cells that belong to a base station to which a specific user equipment belongs are the relation of intra base stations 110, 120 with a specific user equipment. Namely, cells that share a base station to which a user equipment belongs are cells corresponding to the intra base stations 110 and 120 while cells that belong to other base stations are cells corresponding to the inter base station 130. In this way, although cells based on the same base station as that of a specific user equipment transmit and receive information (for example, data, channel status information (CSI)) through 2 interface, cells based on a base station different from that of a specific user equipment can transmit and receive information through a backhaul 140.

As illustrated in FIG. 1, a single cell MIMO user 150 located within a single cell performs communication with a single serving base station in one cell (sector), and a multi-cell MIMO user 160 located at the cell edge performs communication with a plurality of serving base stations in multiple cells (sectors).

In order to preferably perform the aforementioned CoMP operation, the user equipment should transmit much feedback information to the base station. Such a method for transmitting feedback information according to the related art has a problem in that overhead of uplink resources increases due to feedback transmission. Also, overhead of backhaul and delay due to excessive exchange of feedback information may cause a significant problem for the system.

SUMMARY OF THE INVENTION

Accordingly, the present invention is directed to a method of transmitting CoMP feedback information, which substantially obviates one or more problems due to limitations and disadvantages of the related art.

An object of the present invention is to provide a method of efficiently transmitting CoMP feedback information from a user equipment to reduce inter-cell interference. Additional advantages, objects, and features of the invention will be set forth in part in the description which follows and in part will become apparent to those having ordinary skill in the art upon examination of the following or may be learned from practice of the invention.

The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a method for transmitting coordinated multi-point (CoMP) feedback information at a base station (BS) in a wireless communication system includes receiving a message from a user equipment (UE), the message requesting one or more neighboring cells, which perform a CoMP operation, to restrict use of a beam pattern group in a specific direction; determining the beam pattern group in a specific direction to be restricted per neighboring cell based on the received message; and transmitting a message to the one or more neighboring cells that perform the CoMP operation, the message requesting to restrict use of the determined beam pattern group in the specific direction. In other aspect of the present invention, a method for transmitting coordinated multi-point (CoMP) feedback information at a base station (BS) in a wireless communication system includes receiving information about channel status from a user equipment (UE); and comparing the received information with a predefined threshold value, and transmitting a message to one or more neighboring cells that perform a CoMP operation, the message requesting the one or more neighboring cells to restrict use of a beam pattern group.

In other aspect of the present invention, a method for transmitting coordinated multi-point (CoMP) feedback information at a user equipment (UE) in a wireless communication system includes comparing a value of channel status with a serving cell or an interference level measured from one or more neighboring cells that perform a CoMP operation with a predefined threshold value; and transmitting a message to a serving base station, the message requesting the one or more neighboring cells to restrict use of a specific beam pattern group when the value of the channel status or the interference level of the one or more neighboring cells is not better than the threshold value. In other aspect of the present invention, a base station (BS) for transmitting coordinated multi-point (CoMP) feedback information in a wireless communication system includes a receiving module for receiving a message from a user equipment (UE), the message requesting one or more neighboring cells, which perform a CoMP operation, to restrict use of a beam pattern group in a specific direction; a processor for determining the beam pattern group in a specific direction to be restricted per neighboring cell based on the received message; and a transmitting module for transmitting a message to the one or more neighboring cells that perform the CoMP operation, the message requesting to restrict use of the determined beam pattern group in the specific direction.

In other aspect of the present invention, an user equipment (UE) for transmitting coordinated multi-point (CoMP) feedback information at a user equipment (UE) in a wireless communication system includes a processor for comparing a value of channel status with a serving cell or an interference level measured from one or more neighboring cells that perform a CoMP operation with a predefined threshold value; and a transmitting module for transmitting a message to a serving base station, the message requesting the one or more neighboring cells to restrict use of a specific beam pattern group when the value of the channel status or the interference level of the one or more neighboring cells is not better than the threshold value.

In other aspect of the present invention, a base station (BS) for transmitting coordinated multi-point (COMP) feedback information in a wireless communication system includes a receiving module for information about channel status from a user equipment (UE); a processor for comparing the received information with a predefined threshold value; and a transmitting module for transmitting a message to one or more neighboring cells that perform a CoMP operation, the message requesting the one or more neighboring cells to restrict use of a beam pattern group.

According to the present invention, a cell-specific beam pattern restriction scheme is used under the multi-cell environment, whereby inter-cell interference can be reduced effectively. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description can be applied to other mobile communication systems except unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment designates a mobile or fixed type user terminal such as a mobile station (MS). It is also assumed that a base station designates a random node of a network node, such as Node B and eNode B, which performs communication with a user equipment.

In the mobile communication system, a user equipment can receive information from a base station through a downlink. Also, the user equipment can transmit information through an uplink. Examples of information transmitted from and received by the user equipment include data and various kinds of control information. Various physical channels exist depending on types of information transmitted from or received by the user equipment.

Figure 1:
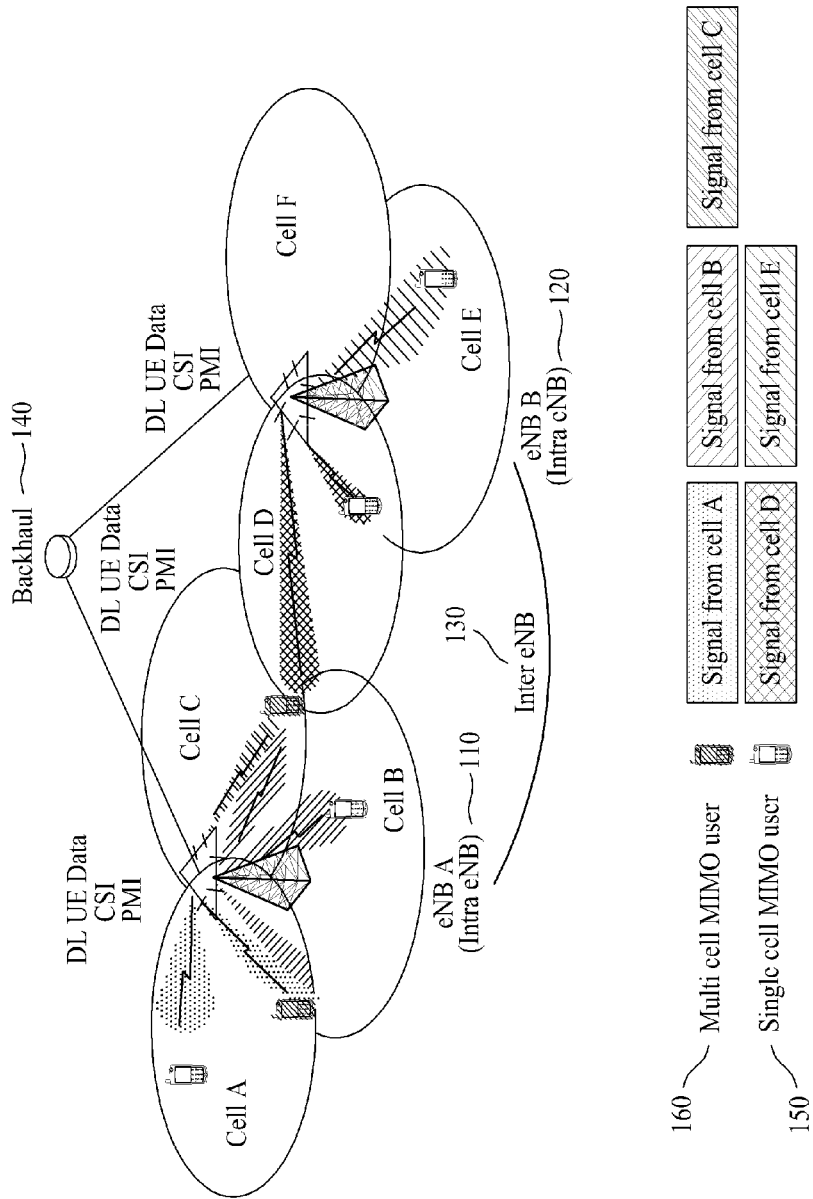
FIG. 1 is a conceptional diagram illustrating CoMP of intra base stations (intra eNB) and an inter base station (inter eNB) according to the related art.
Figure 2:
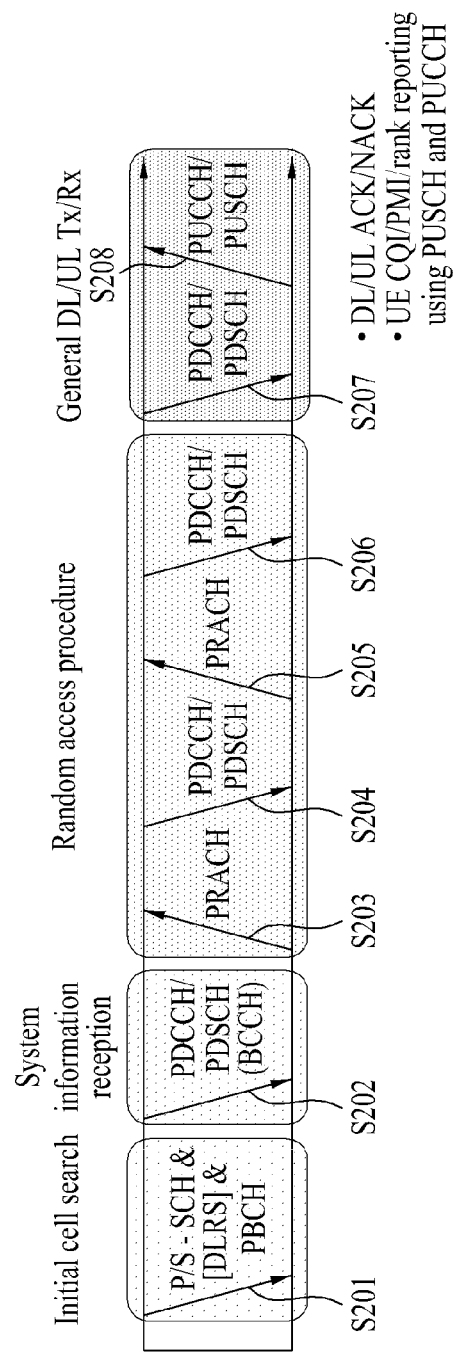
FIG. 2 is a diagram illustrating physical channels used in a $3^{rd}$ generation partnership project long term evolution (3GPP) system, which is an example of a mobile communication system, and a general method for transmitting a signal using the physical channels.

FIG. 2 is a diagram illustrating physical channels used in a $3^{rd}$ generation partnership project long term evolution (3GPP) system, which is an example of a mobile communication system, and a general method for transmitting a signal using the physical channels.

The user equipment performs initial cell search such as synchronizing with the base station when it newly enters a cell or the power is turned on in step S201. To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within a cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDCCH) and a physical downlink control channel (PDSCH) according to the physical downlink control channel information in step S202.

Meanwhile, if the user equipment initially accesses the base station, or if there is no radio resource for signal transmission, the user equipment performs a random access procedure (RACH) for the base station, such as step S203 to S206. To this end, the user equipment transmits a preamble of a specific sequence through a random physical random access channel (PRACH) (S203), and receives a response message to the random access through the PDCCH and a PDSCH corresponding to the PDCCH (S204). In case of contention based random access except for handover, a contention resolution procedure such as transmission (S205) of PRACH and reception (S206) of PDCCH/PDSCH can be performed additionally.

The user equipment which has performed the aforementioned steps receives the PDCCH/PDSCH (S207) and transmits a physical uplink shared channel (PUSCH) and a physical uplink control channel (PUCCH) (S208), as a general procedure of transmitting uplink/downlink signals. The control information transmitted from the user equipment to the base station or received from the base station to the user equipment through the uplink includes downlink/uplink ACK/NACK signals, channel quality information (CQI), a precoding matrix index (PMI), and a rank indicator (RI). In case of the 3GPP LTE system, the user equipment transmits control information such as the aforementioned CQI/PMI/RI through the PUSCH and/or the PUCCH.

In the present invention, the terminology, base station can be referred to as a cell or sector if it is used as a geographical concept. The serving base station (or cell) may be regarded as a base station (or cell) that provides a main service to the user equipment, can perform transmission and reception of control information on a coordinated multiple transmission point. In this respect, the serving base station (or cell) can be referred to as an anchor base station (or anchor cell). The serving base station can transmit various kinds of information, which are received from the user equipment, to a neighboring base station (cell). Likewise, the neighboring base station can be referred to as a neighboring cell if it is used as a geographical concept.

When a CoMP system is used under the multi-cell environment, communication throughput of a user equipment at the cell edge can be improved. Examples of the CoMP system include coordinated MIMO type joint processing (JP), coordinated scheduling/beamforming (CS/CB) for reducing inter-cell interference such as worst companion and best companion, and a geographical transmission process (for example, multi-antenna) scheme.

Particularly, the coordinated scheduling/beamforming (CS/CB) scheme can reduce inter-cell interference in such a manner that the user equipment transmits restricted and/or recommended PMI to the serving base station to reduce interference from one or more neighboring cells. In this case, according to the worst companion scheme, as the user equipment reports a PMI having the highest interference for cells that perform CoMP to the serving base station, the corresponding neighboring cells may remove inter-cell interference by using suboptimal PMI except for the PMI having the highest interference. According to the best companion scheme, as the user equipment reports a PMI having the lowest interference for one or more neighboring cells that perform CoMP to the serving base station, the corresponding neighboring cells may alleviate inter-cell interference by using the PMI having the lowest interference.

If such a CoMP system is used, the user equipment can be supported with data from multi-cell base stations jointly. In other words, communication throughput of the user equipment at the cell edge area can be improved by the CoMP operation under the multi-cell environment.

In order to efficiently perform the multi-cell based CoMP operation system such as the joint processing scheme and the coordinated scheduling/beamforming (CS/CB) scheme, the user equipment can feed channel information (for example, channel status information (CSI) for neighboring cells, channel quality indicator (CQI), precoding matrix index (PMI), rank indicator (RI), noise and interference variance, carrier to interference plus noise ratio (CINR) value (or signal to interference plus noise ratio (SINR) value), an improved CINR value of a serving cell, etc.) to the serving base station or the one or more neighboring base stations, wherein the improved CINR value indicating how the channel status of the serving cell has been improved by comparing a CINR value (or SINR value) measured when a neighboring cell uses a good PMI or does not use a bad PMI with a previous CINR value (or SINR value). The cell which has received such channel information shares the channel information with the one or more neighboring cells that performs CoMP operation, and efficiently performs the CoMP operation based on the shared channel information.

As described above, although the cell can perform the efficient CoMP operation based on the feedback information of the user equipment, use of uplink resources may increase due to feedback and backhaul overhead may increase during information sharing between the neighboring cells. For this reason, a problem such as backhaul delay may be caused.

The user equipment that performs the CoMP operation is likely to be subject to serious interference from a neighboring cell, or the user equipment may located at the cell edge area so that the channel status may not be supported sufficiently from the serving cell. The user equipment located at the cell edge area moves at low speed and mainly receives data at rank 1. In case user equipment located at the cell edge area that performs the CoMP operation, in addition to the method based on the feedback information of the user equipment, which increases uplink and backhaul overhead, a method of using a beam pattern (for example, PMI) previously defined during cell deployment may be considered.

The beam pattern of each cell may be formed previously in a specific direction during initial cell deployment. In particular, the beam pattern of rank 1 generally has clearer directionality than that of beam of higher rank. Each cell can share beam pattern information of a specific directionality, which allows respective neighboring cells to be affected by each another. Accordingly, if beam pattern restriction is requested from a specific cell, the corresponding cell restricts a beam group having directionality toward the specific cell to reduce inter-cell interference.

In addition to the UE-specific beam restriction scheme that reduces inter-cell interference as a neighboring cell restricts and/or recommends a specific PMI that affects the user equipment, there is provided a cell-specific beam pattern restriction scheme (hereinafter, abbreviated as 'beam pattern restriction scheme') that restricts a beam pattern group towards a specific cell for a neighboring cell that severely interferes with the specific cell. During cell deployment, the beam pattern group having directionality between cells may be configured uniformly, or may be configured non-uniformly depending on a specific object.

Figure 3:
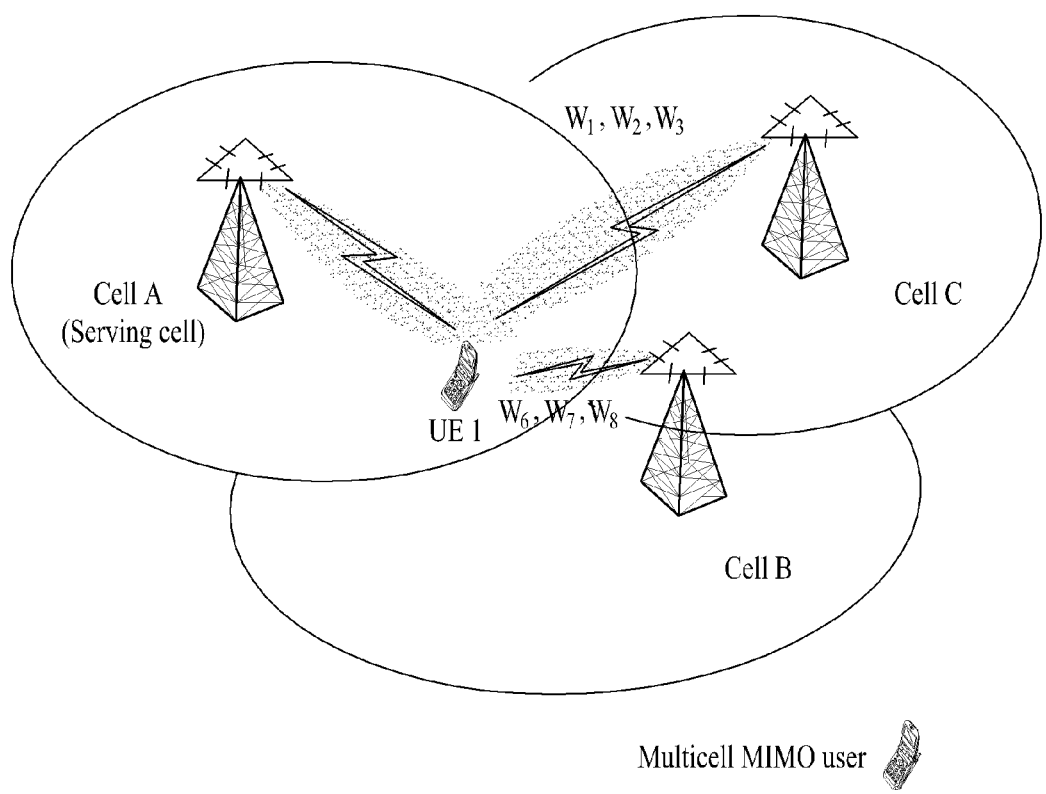
FIG. 3 is a diagram illustrating a concept of a cell-specific beam pattern restriction scheme according to the present invention.

FIG. 3 is a diagram illustrating a concept of a cell-specific beam pattern restriction scheme according to the present invention.

Referring to FIG. 3, it is assumed that three cells (cell A, B and C) perform the CoMP operation. In this case, the user equipment 1 is the user equipment belonging to cell A (i.e., cell A is a serving cell, and cell B and cell C are neighboring cells). The cell B has a beam pattern group (W1, W2, W3) having directionality toward cell A of beam patterns of rank 1 while the cell C has a beam pattern group (W6, W7, W8). This is predefined set during cell deployment. If the cell edge user equipment 1 belonging to the cell A receives a serious interference signal from the cells B and C, the user equipment 1 or the serving cell (cell A) can request the neighboring cells B and C to restrict the beam pattern group having directionality of cell A. Then, the cells B and C can respectively restrict use of the beam pattern groups (W1, W2, W3) and (W6, W7, W8). Such restriction of the beam pattern group (for example, PMI) is limited to a specific resource (for example, in unit of slot, subframe, or subband) determined by the neighboring cell or requested by the serving cell, whereby flexibility and efficiency in use of resources can be ensured.

For operation of the cell-specific beam restriction (or avoidance) scheme, the user equipment may transmit feedback information to the serving base station. For the cell-specific beam restriction scheme, the user equipment may transmit simple feedback information such as message of a predetermined bit size (for example, 1 bit) to the serving base station to request interference restriction for a neighboring cell. At this time, uplink message bit-width may be varied depending on how many beam pattern groups substantially cause interference. The feedback information may be varied depending on whether the cell-specific beam restriction scheme is triggered by the user equipment or the serving base station.

First of all, triggering of the cell-specific beam restriction scheme at the user equipment will be described.

The user equipment may request cell-specific beam restriction (or avoidance) to the serving base station. The user equipment may compare a channel status value with a predefined threshold value, and when the channel status of the user equipment does not satisfy the predefined threshold value, the user equipment may request cell-specific beam restriction. The channel status of the user equipment may be varied depending on whether the user equipment has measured the neighboring cell.

In a state that the user equipment does not measure channel status with the neighboring cell, if the user equipment performs single cell based communication, the user equipment may determine whether to request cell-specific beam restriction by comparing the channel status value such as CQI with the threshold value based on a noise and interference level from the other one or more cells except for the serving cell. In this case, the user equipment may transmit a message of a predetermined bit size to the serving base station through a physical uplink control channel (PUCCH) or a physical uplink shared channel (PUSCH), wherein the message is to request cell-specific beam restriction. Alternatively, the user equipment may transmit the message to the serving base station through RRC message. The serving base station which has received the message may request a neighboring cell, which performs CoMP operation, to restrict a beam pattern group.

In the contrary, if the user equipment performs measurement (i.e, channel status measurement) for a neighboring cell, the user equipment may compare measured channel status of the serving cell with a threshold value obtained based on interference level, etc. of corresponding neighboring cells. If the channel status of the serving cell does not satisfy the threshold value, the user equipment may determine whether to request cell-specific beam restriction. In this case, after the user equipment performs measurement, the user equipment may transmit measurement information to the serving base station or not.

First of all, the case where the user equipment transmits measurement information to the serving base station after performing measurement for a neighboring cell will be described. The user equipment may transmit measurement information such as reference signal received power (RSRP) and reference signal received quality (RSRQ) to the serving base station together with cell ID of the neighboring cell. Then, the serving base station can identify neighboring cell ID information and interference level of the corresponding user equipment which has transmitted measurement information of the neighboring cell. Accordingly, the user equipment may determine whether to request the neighboring cell to restrict cell-specific beam by comparing the channel status with the threshold value using the interference level caused by each neighboring cell.

If the user equipment determines to request cell-specific beam restriction, the user equipment may request such beam pattern restriction to one or more neighboring cells causing the most interference to the user equipment. In the case that the user equipment requests beam restriction for one or more neighboring cells, the user equipment may request such beam pattern restriction for either a predetermined number of neighboring cells, or all neighboring cells exceeding the threshold value. The user equipment may transmit a message of a predetermined bit size to the serving base station through the PUCCH, the PUSCH, or RRC message to request cell-specific beam restriction for the neighboring cell. This cell-specific beam restriction request message may be transmitted in the order of neighboring cell having higher interference level without cell ID or cell ID index. Unlike this, the cell-specific beam restriction request message may be transmitted together with cell ID index of the corresponding neighboring cell, or only cell ID index may be transmitted. The serving base station can sort the measurement information for the neighboring cell in the order of interference level. The sorted information may be shared between the user equipment and the base station without separate signaling. The user equipment may transmit the restriction request message for the neighboring cell without cell ID index based on the sorted information. In this way, the serving base station may request the neighboring cell to restrict the specific beam pattern group.

The case where the user equipment does not transmit measurement information to the serving base station after performing measurement (e.g., channel status) for a neighboring cell will be described. In this case, the user equipment may transmit cell ID of the neighboring cell which the user equipment desires to restrict, to the serving base station together with the cell-specific beam restriction request message. Alternatively, the user equipment may transmit cell ID only to the serving base station. The user equipment may additionally transmit the interference level caused from the corresponding neighboring cell to the serving base station. Whether the user equipment will request cell-specific beam restriction for the neighboring cell may be determined by comparing the threshold value with the measurement value. As described above, the user equipment may request cell-specific beam pattern restriction for one or more neighboring cells. The serving base station which has received the request of cell-specific beam pattern restriction may transmit a signal or message to the corresponding neighboring cell, wherein the signal or message requests to restrict use of a specific beam pattern group.

When a user equipment transmits a request message to the serving base station after determining to request cell-specific beam restriction, the user equipment may allow the serving base station to request an unspecified neighboring cell not a specific neighboring cell to restrict a beam pattern. In this case, the user equipment may transmit one restriction request message to the serving cell regardless of cell ID, and the serving cell may request the neighboring cell, which is geographically located close thereto, to restrict one or more beam pattern groups having directionality toward the serving cell.

The serving base station may randomly trigger cell-specific beam restriction. The serving base station can receive single cell based channel information from the user equipment periodically or aperiodically. The serving base station compares the channel information received from the user equipment with the threshold value. If the channel information does not satisfy the threshold value, the serving base station may randomly request the neighboring cell to restrict the beam pattern group. Otherwise, in the case that the user equipment has transmitted measurement information to the base station after performing measurement, the base station may request a neighboring cell causing most interference to the user equipment, a predetermined number of neighboring cells having high interference, or neighboring cells causing interference exceeding the threshold value, to restrict the beam pattern group having directionality toward the corresponding cells (e.g., serving cell).

Hereinafter, information exchanged between base stations (or cells) will be described.

Figure 4:
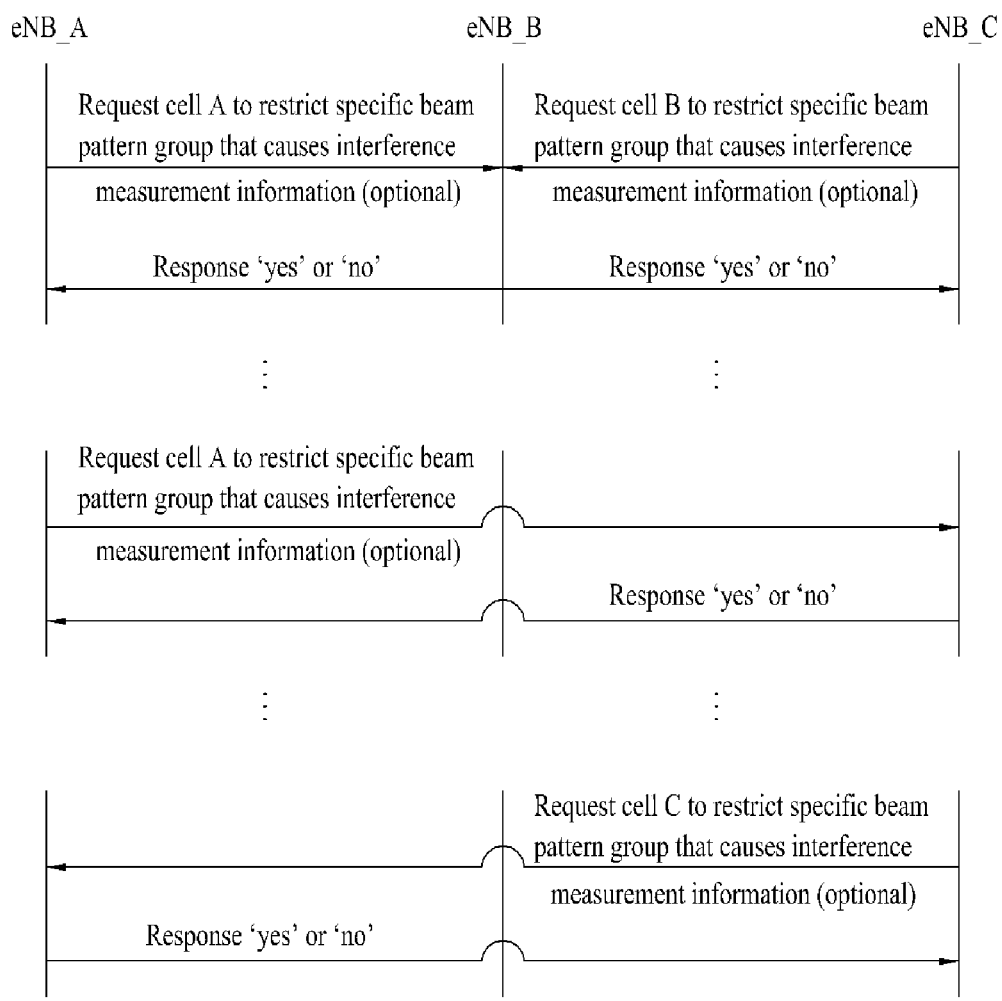
FIG. 4 is a diagram illustrating an example for cell-specific beam restriction at CoMP operation according to the present invention.

FIG. 4 is a diagram illustrating an example for cell-specific beam restriction at CoMP operation according to the present invention.

Referring to FIG. 4, if a specific user equipment transmits a request message for cell-specific beam restriction to a serving base station (for example, eNB_A) for the specific user equipment, the serving base station eNB_A may transmit the request message to neighboring cells (eNB_B, eNB_C). Also, if the serving base station eNB_A randomly requests the neighboring cells eNB_B, eNB_C to restrict cell-specific beam, the serving base station eNB_A may share information of beam pattern group restriction and associated information such as interference level to and from the neighboring cells (hereinafter, abbreviated as 'COMP neighboring cells') eNB_B, eNB_C. As a result, cell-specific beam restriction can efficiently be performed between the cells.

As described above, the serving base station eNB_A for the specific user equipment can request the neighboring cells eNB_B, eNB_C to restrict use of the beam pattern group having directionality toward the cell to which the serving base station belongs if the serving base station is affected by interference from the neighboring cells eNB_B, eNB_C. At this time, the restriction request message may be transmitted to the neighboring cells at a predetermined bit size (for example, more than 1 bit). For example, the specific neighboring cell eNB_B receives the cell-specific beam restriction request message from several base stations eNB_A, eNB_C (or cells), and restricts the beam pattern based on the restriction request message. However, if the specific neighboring cell eNB_B is requested restriction from the several base stations eNB_A, eNB_C, the specific neighboring cell needs to determine what beam pattern is restricted most efficiently. This can be regarded as a ranking problem.

In order to solve such a ranging problem, the serving base station eNB_A may transmit the cell-specific beam restriction request message to the corresponding neighboring cells eNB_B, eNB_C together with information of interference level generated by the corresponding neighboring cells eNB_B, eNB_C. The neighboring cells which have received the request message and the interference level information can determine what beam pattern may be restricted most efficiently, by using the interference level information. In this way, after the cell-specific beam pattern to be restricted is determined, the neighboring cells may respond to each serving base station (for example, eNB_A) as to whether to restrict the requested specific beam pattern.

As described above, scheduling information as well as the beam pattern group restriction request message and the interference level information (or measurement information) may be exchanged between the base stations. When the beam pattern group for the neighboring cells is restricted due to the beam pattern group restriction request between the base stations, much damage may be caused to throughput of the user equipment within the corresponding cell if the beam pattern restriction is applied to all bands or all radio frames. Accordingly, scheduling for transmission information and time/frequency resource allocation between the base stations should be performed efficiently, whereby the transmission resources can be used efficiently. In other words, scheduling information for applying restriction for a specific cell to a specific resource (any one of one subframe, one slot, two or more subframes, and two or more slots) is shared between the base stations, whereby the beam patterns that cause interference each other can be used efficiently in a specific resource unit (for example, specific subframe or subband unit). In this case, the scheduling information can be shared as L1/L2 control information through X2 interface. Alternatively, the scheduling information may be shared as L3 RRC connection control information.

Figure 5:
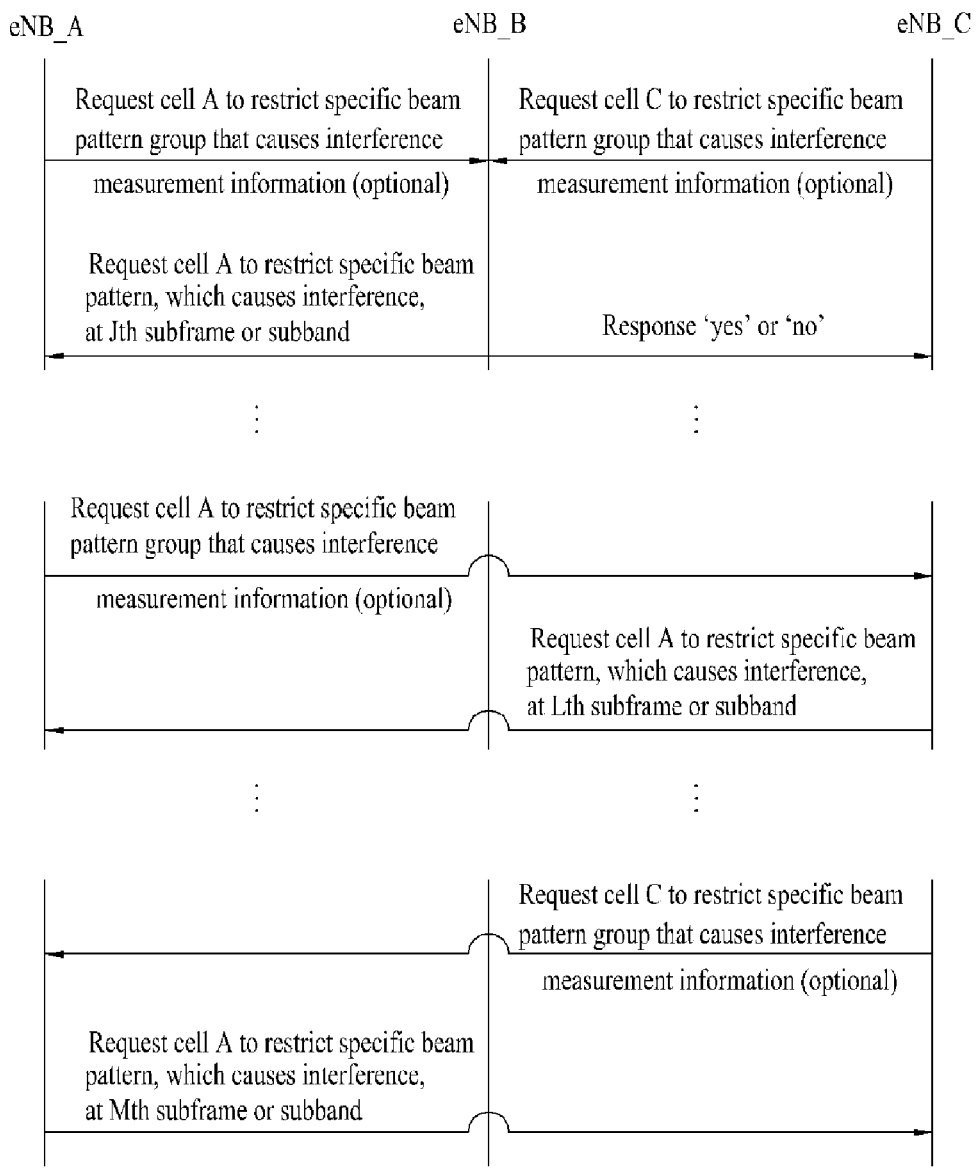
FIG. 5 is a diagram illustrating another example for cell-specific beam restriction at CoMP operation according to the present invention.

FIG. 5 is a diagram illustrating another example for cell-specific beam restriction at CoMP operation according to the present invention.

Referring to FIG. 5, if each serving base station (for example, eNB_A) which has received a beam pattern restriction request message from a specific user equipment, the each serving base station may request corresponding neighboring cells (eNB_B, eNB_C) to restrict the beam pattern. The corresponding neighboring cells eNB_B, eNB_C collect beam pattern restriction request information received from several cells, and then can perform scheduling as to whether a specific beam pattern having directionality toward a specific cell should be used for what resource. In this case, a specific resource of which use will be restricted may be a specific subframe or subband.

As illustrated in FIG. 5, for example, the specific neighboring cell eNB_B can perform scheduling and transmit scheduled information to each of the serving base stations eNB_A, eNB_C which have transmitted the restriction request. In other words, the specific neighboring cell eNB_B can transmit a message to the serving base station eNB_A, wherein the message indicates that the beam pattern group requested from the serving base station eNB_A to restrict its use will not be used at the Jth subframe or subband. Also, for example, the specific neighboring cell eNB_B can perform scheduling and transmit scheduled information to each of the serving base stations eNB_A, eNB_C which have transmitted the restriction request. In other words, the specific neighboring cell eNB_B can transmit a message to the serving base station eNB_C, wherein the message indicates that the beam pattern group requested from the serving base station eNB_C to restrict its use will not be used at a specific resource (for example, the Jth subframe or subband).

The serving base station which has received the scheduling information can perform scheduling for the user equipment located within its cell based on the scheduling information. The aforementioned cell-specific beam pattern restriction scheme described with reference to FIG. 5 relates to the case where the neighboring cell performs scheduling.

Figure 6:
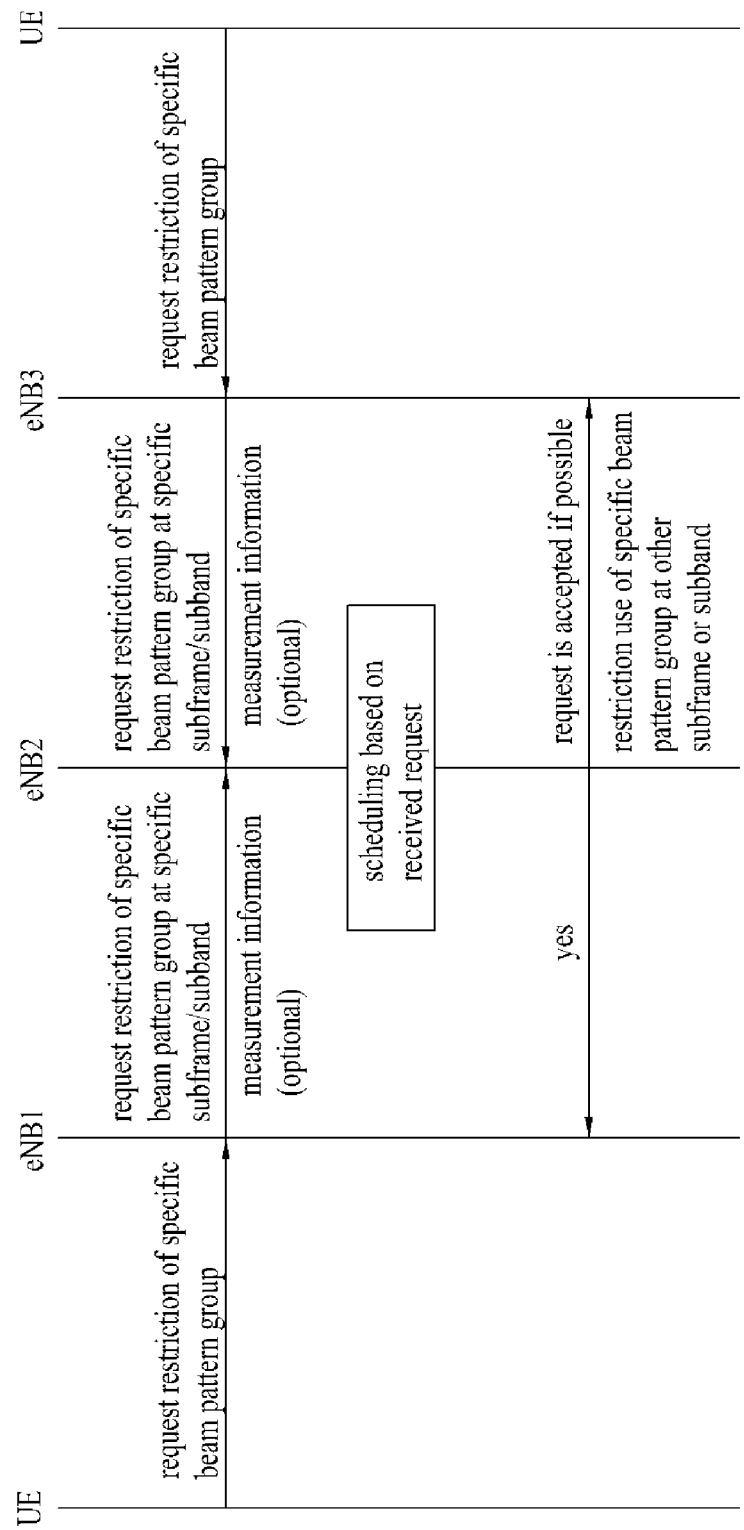
FIG. 6 is a diagram illustrating still another example for cell-specific beam restriction at CoMP operation according to the present invention.

FIG. 6 is a diagram illustrating still another example for cell-specific beam restriction at CoMP operation according to the present invention.

Referring to FIG. 6, the user equipment may transmit a request message for restriction of a specific beam pattern group to serving base stations eNB 1 and eNB 3. The serving base stations eNB 1 and eNB 3 may transmit scheduling information to a corresponding neighboring cell eNB 2 together with the received specific beam pattern group restriction request message. In other words, the serving base stations eNB 1 and eNB 3 requests the corresponding neighboring cell eNB 2 to restrict a beam pattern having directionality toward a corresponding cell for a specific subframe or subband by performing scheduling, respectively. Also, the serving base stations eNB 1 and eNB 3 may additionally transmit information (associated information) of interference level for the neighboring cell eNB 2 to the corresponding neighboring cell eNB 2. At this time, the information (associated information) about the interference level may be measured by the user equipment and then transmitted to the serving base stations eNB1 and eNB3.

The corresponding neighboring cell eNB 2 which has received the restriction request and the scheduling information from several cells performs scheduling for the several neighboring cells based on the received scheduling information and reports the result (response) of scheduling to the cells eNB 1 and eNB 3 which have transmitted the restriction request. The response includes a message indicating that the specific beam pattern group restriction request will be accepted or rejected. Also, if the neighboring cell eNB 2 rejects the specific beam pattern group restriction request, the neighboring cell eNB 2 may transfer suboptimal suggestions to the serving base station (for example, eNB 3). In other words, the neighboring cell eNB 2 may transmit information of suboptimal subframe or subband not a specific resource (for example, specific subframe or subband) for which the specific beam pattern restriction has been requested.

The user equipment can transmit scheduling information of the neighboring cell to the serving base station. In addition to the method that the serving base station which has received the specific beam pattern group restriction request from the user equipment transmits the scheduling information to the corresponding neighboring cell, it may be considered that the user equipment directly transmits the scheduling information of the neighboring cell to the serving base station. The case where the user equipment directly transmits scheduling information to the serving base station can be divided into two types.

Figure 7:
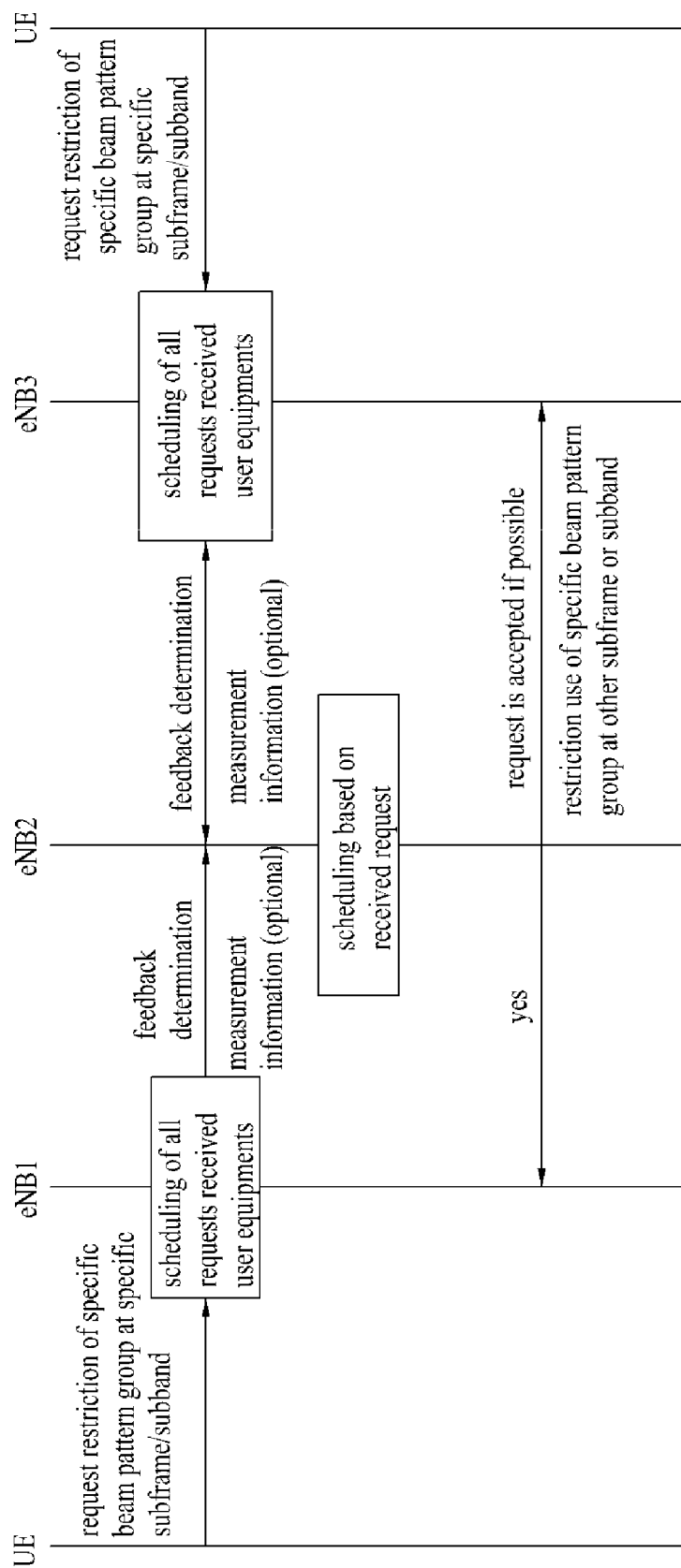
FIG. 7 is a diagram illustrating further still another example for cell-specific beam restriction at CoMP operation according to the present invention.

FIG. 7 is a diagram illustrating further still another example for cell-specific beam restriction at CoMP operation according to the present invention.

Referring to FIG. 7, the user equipment can perform scheduling as to whether the beam pattern group will be restricted for the neighboring cell at what resource (e.g., subframe or subband). Then, the user equipment may transmit the scheduling information to the serving base stations eNB 1 and eNB3 together with a specific beam pattern group restriction request for a specific subframe or subband. The serving base stations eNB 1 and eNB 3 collect the scheduling information received from several user equipments within its cell and then perform scheduling for the beam pattern group restriction request by considering information (associated information) about interference level for the neighboring cell and traffic of the corresponding neighboring cell as well as the scheduling information. Namely, the serving base stations eNB 1 and eNB 3 can perform scheduling for the user equipment affected by interference the most and the neighboring cell that affects interference the most.

In this way, the serving base stations eNB 1 and eNB 3 may transmit the determined scheduling information to the neighboring cell eNB 2, and the neighboring cell eNB 2 may perform scheduling efficiently based on the received information. The neighboring cell eNB 2 may perform scheduling and report the result of scheduling to the serving base stations eNB 1 and eNB 3. Namely, the neighboring cell eNB 2 can respond to the serving base station eNB 1 that the specific beam pattern group will be restricted at the specific subframe or subband requested from the serving base station eNB 1 to restrict the specific beam pattern group. Also, the neighboring cell eNB 2 may transmit, to the serving base station eNB 3, a message indicating that the specific beam pattern group restriction at the specific subframe or subband, which is requested from the serving base station eNB 3, will be accepted if possible, or a message indicating that the requested specific beam pattern group will not be used at another subframe or subband not the specific subframe or subband.

Figure 8:
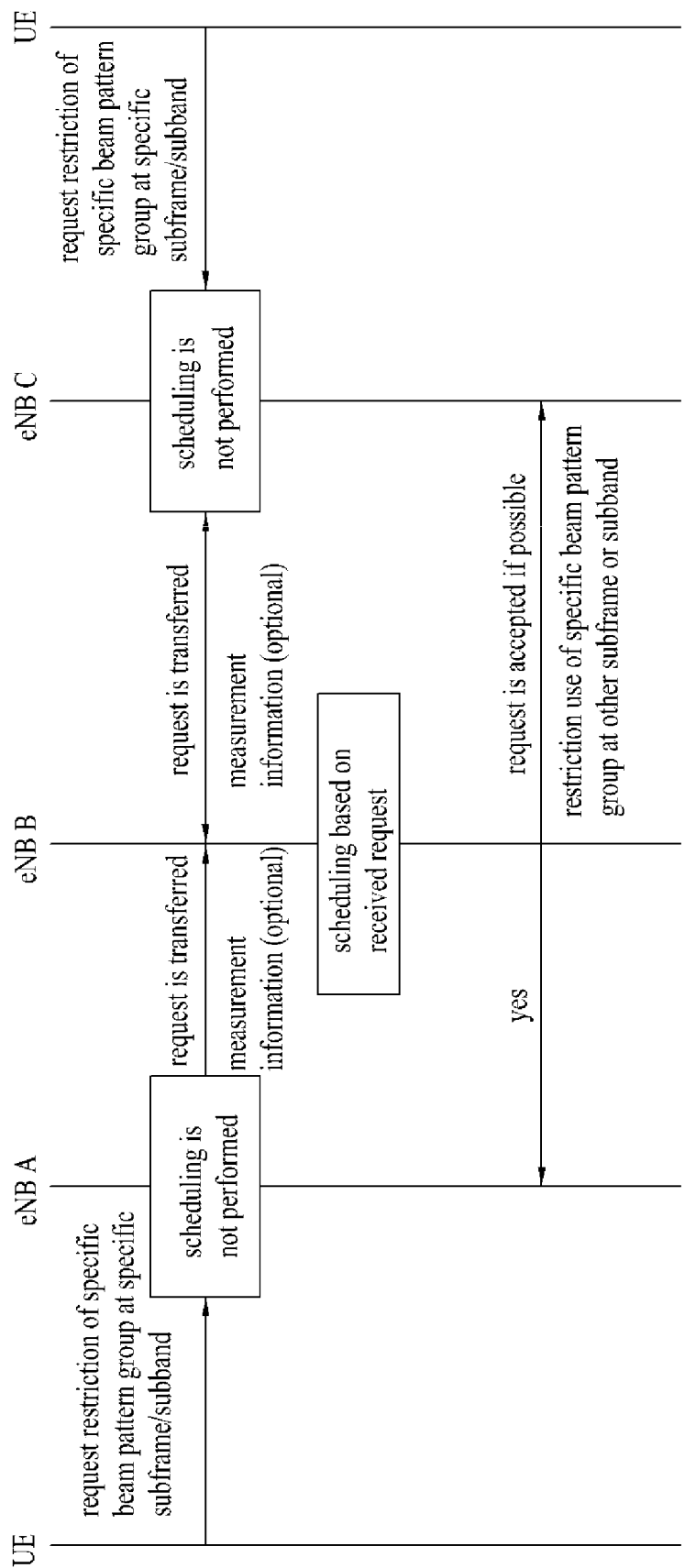
FIG. 8 is a diagram illustrating further still another example for cell-specific beam restriction at CoMP operation according to the present invention.

FIG. 8 is a diagram illustrating further still another example for cell-specific beam restriction at CoMP operation according to the present invention.

FIG. 8 relates to the second case where the user equipment directly performs scheduling. In the same manner as FIG. 7, the user equipment can perform scheduling as to whether the beam pattern group for the neighboring cell eNB B will be restricted at what subframe or subband. Then, the user equipment can transmit the scheduling information to the serving base stations eNB A and eNB C together with the specific beam pattern group request for the specific subframe or subband.

The serving base stations eNB A and eNB C may transmit the scheduling information received from the user equipment to the corresponding neighboring cell without any special processing. In other words, the user equipment may transmit scheduling information to the serving base stations eNB A and eNB C, wherein the scheduling information requests to restrict the beam pattern group causing most interference to the user equipment at the specific subframe or subband. The serving base stations eNB A and eNB C may transmit the scheduling information to the neighboring cell eNB B. The serving base stations eNB A and eNB C may additionally transmit information (associated information) about interference level for the neighboring cell to the corresponding neighboring cell eNB B. At this time, the information (associated information) about interference level may be measured by the user equipment and then transmitted to the serving base stations eNB 1 and eNB 3.

The neighboring cell eNB B which has received the information from several cells can efficiently perform scheduling based on the received information. The neighboring cell eNB B can report the result of scheduling to the serving base stations eNB A1 and eNB C. Namely, the neighboring cell eNB B can respond to the serving base station eNB A that the specific beam pattern group will be restricted at the specific subframe or subband requested from the serving base station eNB A to restrict the specific beam pattern group. Also, the neighboring cell eNB B can transmit, to the serving base station eNB C, a message indicating that the specific beam pattern group restriction at the specific subframe or subband, which is requested from the serving base station eNB C, will be accepted if possible, or a message indicating that the requested specific beam pattern group will not be used at another subframe or subband not the specific subframe or subband.

As described above, the beam restriction (or avoidance) method for restricting the specific beam pattern group of the neighboring cell having directionality toward the serving cell has been described. The case where the beam pattern restriction method is applied to the coordinated scheduling/beamforming (CS/CB) scheme of the CoMP system has been described. However, the cell-specific beam pattern restriction method according to the present invention may also be applied to the joint processing (JP) scheme between multiple cells of the CoMP system. In the case that data are respectively transmitted without sharing between multiple cells, the specific beam pattern group having directionality toward the serving cell can act as interference for the serving cell.

However, in case of the joint processing (JP) scheme that enhances a signal through data sharing between the multiple cells, the beam pattern group having directionality toward the serving cell could be the best beam pattern (for example, PMI) group. Accordingly, the technology of restricting a beam pattern group of a neighboring cell may effectively be applied to the joint processing scheme that enhances a signal of a cell edge user equipment by sharing data between the multiple cells.

Also, in the case that the joint processing scheme and the beam pattern restriction scheme are simultaneously applied to the random system, various methods suggested in the present invention can be applied to the method for beam pattern restriction or both the beam pattern restriction scheme and the joint processing scheme.

For example, in the case that the joint processing scheme is applied between the cells within the intra base station and the beam pattern restriction scheme is applied between the inter base stations, various methods suggested in the present invention can be applied as the methods for restricting the beam pattern group between the inter base stations.

Figure 9:
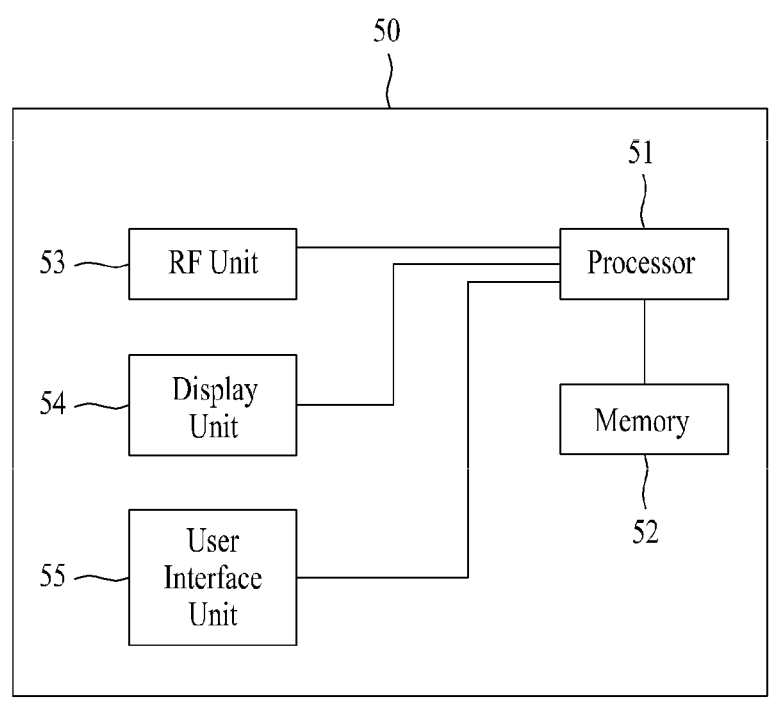
FIG. 9 is a diagram illustrating an example for the user equipment or the base station according to the present invention.

FIG. 9 is a block diagram showing constitutional elements of a device 50 that may be either the UE or the BS of FIG. 9. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The processor 51 may be configured to implement proposed procedures and/or method described in this application. The RF unit 53 may include a receiving module (not shown) and a transmitting module (not shown).

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

What is claimed is:

1. A method for transmitting coordinated multi-point (COMP) feedback information at a serving cell in a wireless communication system, the method comprising:
    receiving information about channel status from a user equipment (UE);
    comparing the received information with a predefined threshold value, and transmitting a message to one or more neighboring cells that perform a CoMP operation, the message requesting the one or more neighboring cells to restrict use of a beam pattern group at a first subframe or subband, but not a second subframe or subband, the beam pattern group having directionality toward the serving cell, wherein the message includes the information about channel status; and
    receiving a response message from the one or more neighboring cells, the response message indicating that the one or more neighboring cells will restrict the use of the requested specific beam pattern group at the second subframe or subband other than the first subframe or subband, the second subframe or subband determined by the one or more neighboring cells based on the information about channel status.

2. The method of claim 1, wherein a value of the channel status is determined using channel status information with the user equipment or information about interference level generated by the one or more neighboring cells that perform the CoMP operation.

3. The method of claim 2, wherein the information about interference level is aligned in the order of interference level.

4. The method of claim 2, further comprising:
    transmitting the information about interference level generated by the one or more neighboring cells to the one or more the neighboring cells.

5. A base station (BS) for transmitting coordinated multi-point (COMP) feedback information in a wireless communication system, the BS comprising:
    a receiving module for receiving information about channel status from a user equipment (UE);
    a processor for comparing the received information with a predefined threshold value;
    a transmitting module for transmitting a message to one or more neighboring cells that perform a CoMP operation, the message requesting the one or more neighboring cells to restrict use of a beam pattern group at a first subframe or subband, but not a second subframe or subband, the beam pattern group having directionality toward the base station (BS), wherein the message includes the information about channel status; and
    a receiving module for receiving a response message from the one or more neighboring cells, the response message indicating that the one or more neighboring cells will restrict the use of the requested specific beam pattern group at the second subframe or subband other than the first subframe or subband, the second subframe or subband determined by the one or more neighboring cells based on the information about channel status.

* * * * *